INVENTOR.
Joachim Kolbe
BY
Andrus & Scealer
Attorney

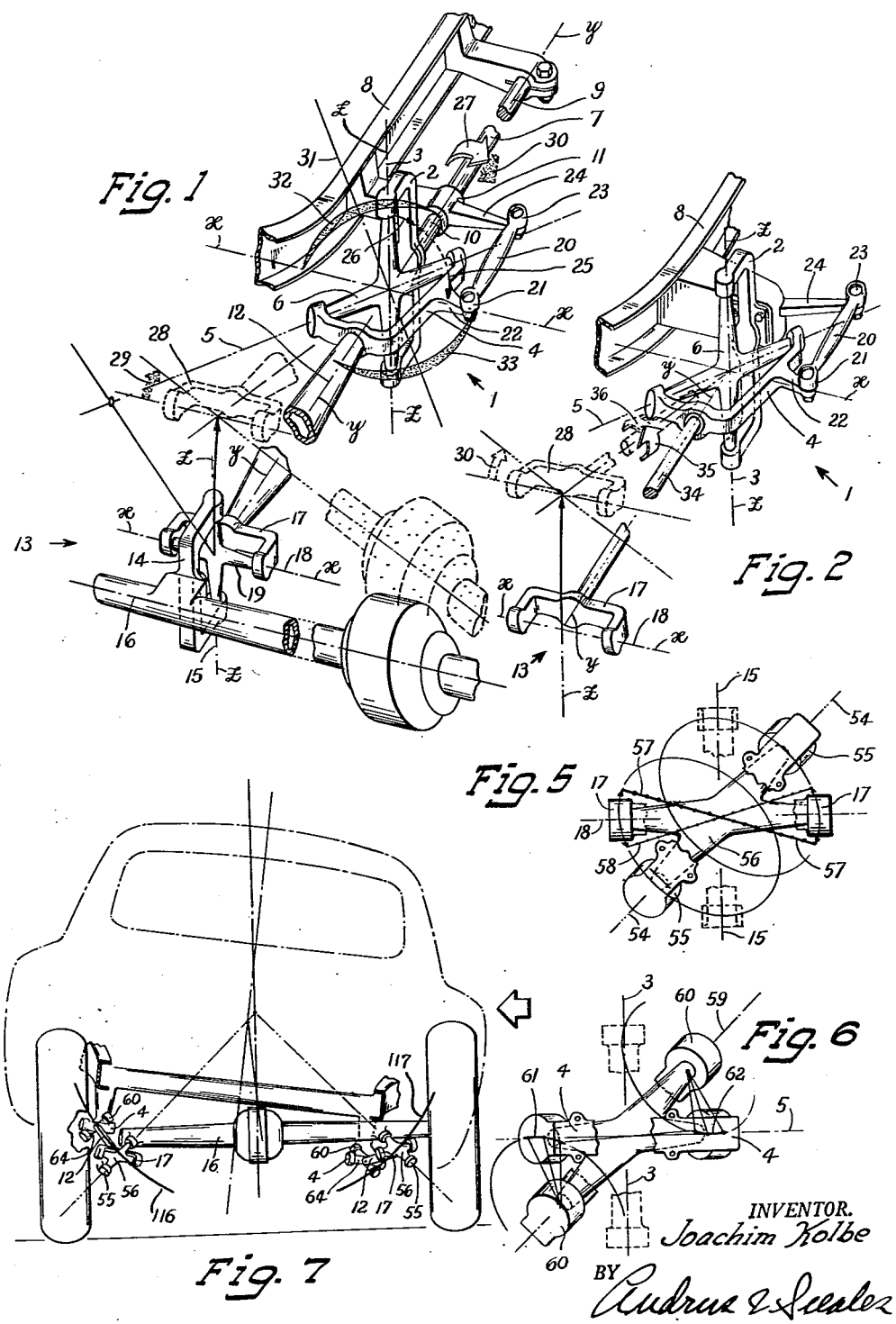

INVENTOR.
Joachim Kolbe

United States Patent Office 2,794,651
Patented June 4, 1957

2,794,651

TORSIONAL ACCELERATION HINGE SUSPENSION FOR BANKING AND NONBANKING VEHICLES

Joachim Kolbe, Menomonee Falls, Wis.

Application June 30, 1955, Serial No. 519,047

21 Claims. (Cl. 280—112)

This invention relates to vehicles and more particularly to an improved automobile suspension having resilient means interposed between the wheel supporting members and the superstructure. The vehicle may be of the kind in which the superstructure leans outwardly during the curve ride or it may be of the kind for which a banked position is secured for the superstructure. The invention will in both cases result in an improved position for the superstructure relative to the road during curve ride.

Vehicles which lean outwardly during curve ride shift into the outwardly inclined position because the resilient supports located on the curve outside carry an increased loading and the resilient supports located on the curve inside carry less than their normal loading, the redistribution of the load resulting from the centrifugal force exerted on the vehicle at that time.

Vehicles constructed to bank during curve ride are disclosed in a number of U. S. patents granted to the present inventor. Patent No. Re. 21,605, issued October 22, 1940, disclosing link mountings, Patent No. 2,576,686, issued November 27, 1951, disclosing banking arms, as well as applicant's copending application Serial No. 382,412, filed September 25, 1953, now Patent No. 2,760,785, dated August 28, 1956, disclosing roll banking arms, are referred to by way of example.

This invention relates more specifically to an improvement for vehicles of the kind wherein the wheels are interconnected by rigid axle structures and wherein resilient means are placed between said rigid axle structures and the superstructure to absorb shocks resulting from driving on an uneven road surface or over obstacles in the road.

By reason of the fact that it is necessary to place the resilient means between the wheels rather than exactly above them in order to secure a low slung chassis for such vehicles, a difference in the amount of deflection of the resilient means results, depending on the movement of either one of a pair of wheels interconnected by the rigid axle structure relative to the other wheel. In relation to a given resistance exerted by the resilient means during parallel vertical upward movement of both wheels, the resistance is less for the same wheel movement of one of the wheels, if the other wheel does not participate in the movement, and is to an even greater extent reduced if the other wheel moves simultaneously downwardly.

The reduction in resistance is not only influenced by the length of the wheel travel but also by the relative effective lever arms on which the forces become effective, and therefore is in each case the result of the product of the change of the travel length for the spring attachment point as compared to the corresponding wheel travel and of the length of the effective lever arm.

The resistance of the resilient means against vertical wheel movement is least in the three cases cited during oppositely directed travel of the wheels relative to the superstructure. This condition occurs during curve ride of the vehicle and whenever the vehicle superstructure shifts sidewardly towards the outside of the curve under the influence of centrifugal force, redistributing the loading on the resilient means as described above.

The principal object of this invention is to operate the resilient means supporting the superstructure of the vehicle upon the wheel supported rigid axle structures during curve ride of the vehicle in a manner which produces an amount of operation and resistance of the resilient means substantially equal to that produced during corresponding parallel wheel movements in straight ahead ride.

Another object is the provision of a vehicle running gear for both nonbanking and banking vehicles in which the resilient means supporting the superstructure offer increased resistance against lateral shifting of the vehicle mass under the influence and in the direction of the centrifugal force active on the vehicle during curve ride.

Another object is to eliminate the need for sway bars or other additional resilient means employed to compensate for the loss of resilient resistance typical of present day vehicle running gear structures.

Another object is to redistribute the effect of sway bars or the like when employed in banking vehicles, to secure the actual banking turn without loss in the resilient resistance against the lateral shifting of the mass of the superstructure during curve ride normally established by the sway bars.

Another object is to provide suspension means including resilient means operated torsionally during all possible wheel movements and with substantially identical spring and wheel rates.

Another object is to provide suspension means, including torsion springs, having an improved relation between spring rate and wheel rate.

Another object is to utilize structure essential to the operation of the suspension means in nonbanking vehicles to facilitate the transformation of such vehicles into banking vehicles and to maintain the beneficial increase in resistance of the resilient means against the lateral shifting of the mass of the vehicle during curve ride.

Another object is to secure the same uniformity in the resistance of the resilient means supporting the superstructure against deflection in curve ride as compared to the varying wheel loads in straight ahead ride as is typical for nonrigid axle structure or independently suspended wheels and to thereby provide more nearly equal lateral shifting of the superstructure where one end thereof is supported by nonrigid axle structures and the other end is supported by rigid axle structures.

Another object is to utilize increases and decreases in the speed of turn typical for universal joints operated at angular positions for securing desirable changes in the resistance of torsional resilient means attached to said universal joints forming part of the vehicle suspension structure.

Another object is to provide various locations for the torsional resilient means and for the universal joints and to provide favorable inclinations for the axes of the various universal joints in relation to the vehicle superstructure and to each other cooperating in the regulation of the oscillation motion and the banking motion of the superstructure.

Another object is to provide a banking arm and tie control linkage, including superstructure supporting resilient means, for banking vehicles.

Another object is to arrange wheel and axle suspension parts in an improved manner to achieve unity in design when independently suspended wheels are employed.

The drawings furnished herewith illustrate the best mode of carrying out the invention as presently contemplated and set forth hereinafter.

In the drawings:

Figure 1 is a perspective schematic view of a single suspension structure unit constructed in accordance with the invention;

Fig. 2 is a perspective schematic view similar to that illustrated in Figure 1 and disclosing a modified form of the invention;

Fig. 5 is an elevation of a single axle-carried universal joint arranged for use in banking vehicles with an outline of the location of related parts as used in nonbanking vehicles;

Fig. 6 is an elevation of a single frame-carried universal joint arranged for use in banking vehicles; and Fig. 7 is a schematic rear elevation of the structure shown in Fig. 4 but with the superstructure turned into a banked position.

Figure 3:
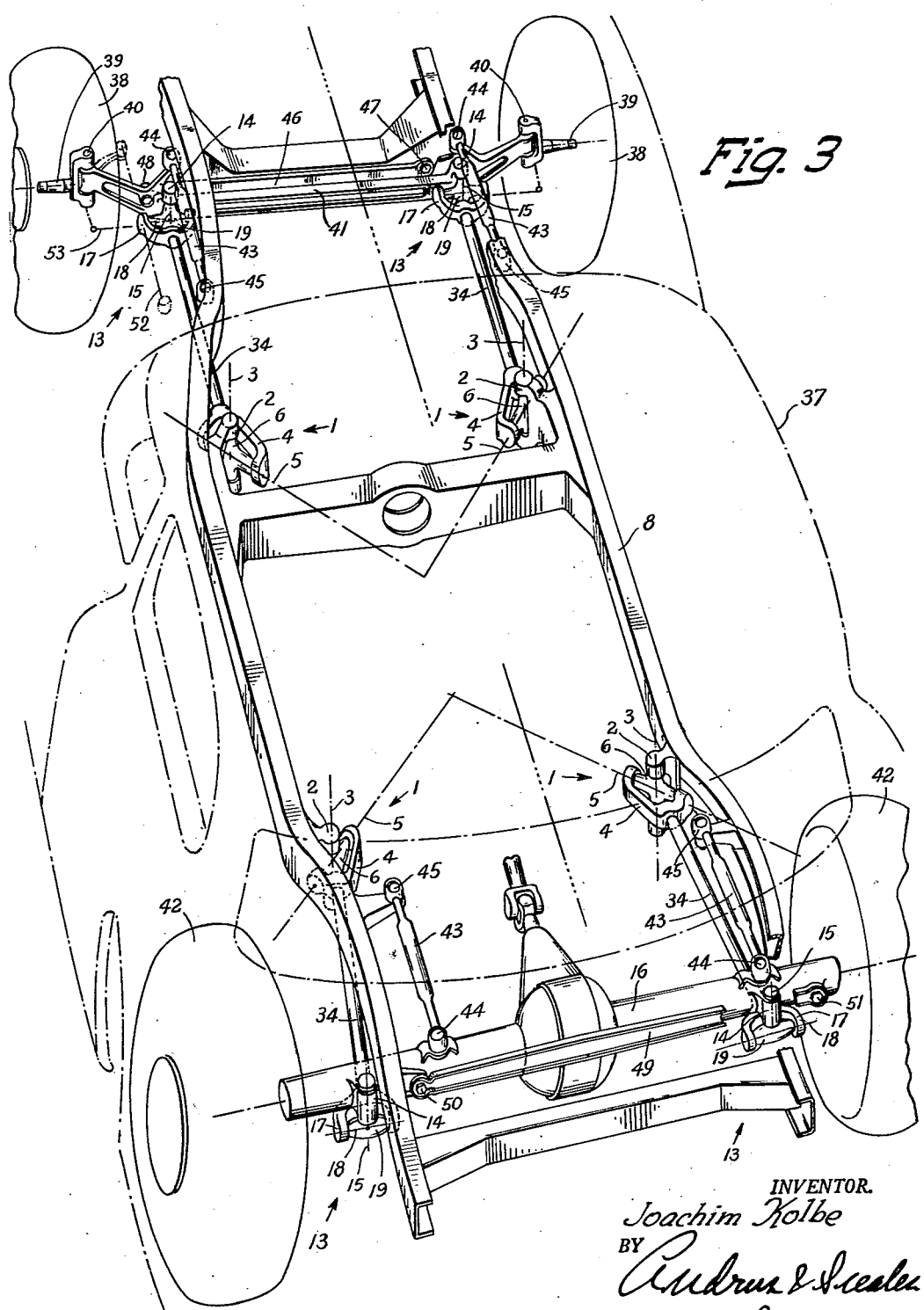
Fig. 3 is a perspective view of a nonbanking vehicle mounting including an overall suspension apparatus.
Figure 4:
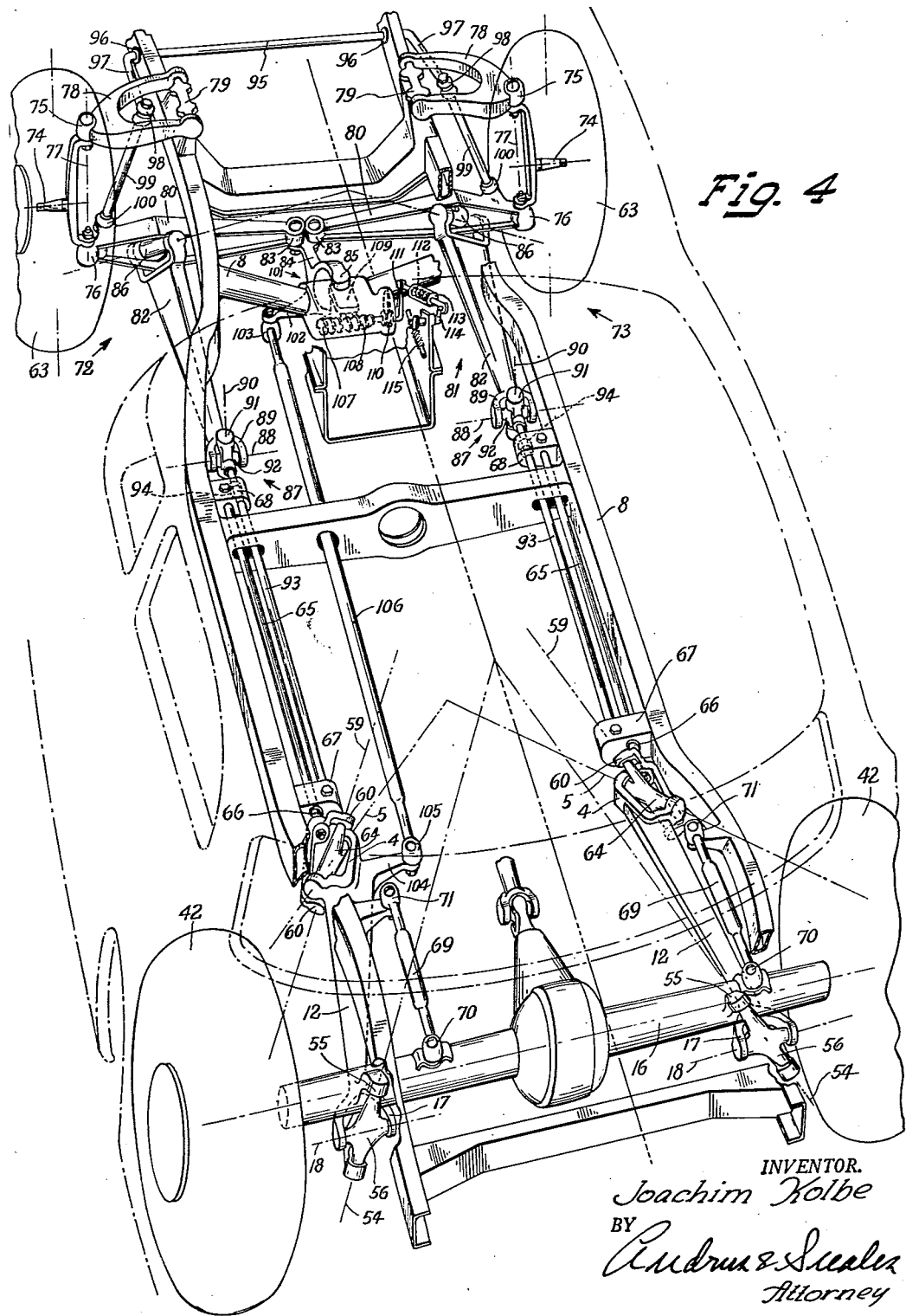
Fig. 4 is a perspective view of a banking vehicle mounting including an overall suspension apparatus.

Figures 1, 2, 5 and 6 of the drawings show single universal joints as applied in this invention. Figures 3, 4 and 7 show the application of a plurality of the universal joints to two individual chassis structures. Before describing the structures illustrated, the problem solved may be stated as follows:

In the case of individual independent wheel suspensions for automobiles, a given upward movement of one wheel relative to the frame will always result in a corresponding spring deflection independent of the position of the other wheel of the pair at that time. The situation is quite different, however, when the springs supporting the superstructure are carried by a rigid axle. These springs either, longitudinally extending leaf springs or coil springs, are placed between the wheels instead of above them to secure as much usable space and access to that space as possible for either the passengers or freight load. Leaf springs supporting the front end of a vehicle above a rigid axle have to be arranged even closer together than those supporting the rear end to allow for space to steer the front wheels.

A wheel supported rigid axle can take three basic positions relative to the superstructure. In position I, when both wheels move simultaneously and at equal distance relative to the road in the same direction, the axle will stay parallel to the road. In position II, when one wheel rolls over an obstacle in the road, the axle will be inclined relative to the road. In position III, when one wheel moves upwardly, while the other wheel moves downwardly relative to an otherwise even roadbed, the axle will move into a position inclined twice as much relative to the road as position II for the same amount of individual wheel movement.

If the springs are placed at ¾ of the distance between the center of the axle and the centers of the wheels and a wheel rate of 100 lbs. resistance per inch of wheel travel is established, the wheel rates and spring rates will be identical for position I. For an axle movement parallel to the road, the spring on each side of the vehicle resists a wheels upward movement of 4 inches with 400 lbs.

For position II, with one wheel only moving upwardly 4 inches, the spring will be compressed ⅞ times 400 lbs. and, with a shorter effective lever arm (wheel and axle swinging about the wheel to road contact point of the other wheel of the pair) a further corresponding reduction in resistance will occur with a resulting ⅞ × ⅞ × 400 = 306 lbs. resistance.

For position III, with one wheel moving 4 inches upwardly and the other wheel moving simultaneously 4 inches downwardly, the center of motion for the axle will be its own center point. A resulting ¾ reduction will occur due to the amount of actual spring compression and a further ¾ reduction due to the ¾ shorter lever arm from spring to axle center as compared to the distance between wheel and axle center. The spring resistance will therefore be only 400 × ¾ × ¾ = 225 lbs.

For trucks with double wheels on each side of the axle, the springs are frequently positioned half way between the wheel track of each outer wheel and the center of the axle. Here the corresponding values are 400 to 250 to 100. For a given desired curve sway resistance therefore, four times as great a resistance in the spring bed for parallel axle movement will have to be coped with.

This invention contemplates a resilient vehicle support which is torsionally stressed for parallel axle upward movement and increasingly torsionally stressed whenever the axle then moves into an inclined position relative to the frame, thereby compensating for the losses normally encountered by reduced spring compression and change in length of the effective lever arms.

Figures 1 and 2 each illustrate schematically a pair of universal joints, one of the pairs supported by the axle and the other in effect by the frame and both interconnected by a suspension arm. In each of the figures, an axis $x$—$x$ indicates a horizontal transverse direction, an axis $y$—$y$ indicates a horizontal longitudinal direction, and an axis $z$—$z$ indicates a vertical direction with regard to the vehicle, the three axes being placed at 90° to each other.

In each of the figures, the pair of universal joints is assumed to support the lower left rear axle suspension arm of a complete vehicle.

In Figure 1, a universal joint 1 comprises a vertically extending hinge fork 2 with its turning axis 3 shown as coinciding with the $z$—$z$ axis, and a horizontally extending hinge fork 4 with its turning axis 5 shown as extending at an angle of approximately 45° relative to both the $x$—$x$ axis and the $y$—$y$ axis. A center cross member 6 interconnects and supports the forks 2 and 4. The fork 2 is carried by a torsion spring rod 7 supported by the frame 8. The forward end 9 of the torsion spring rod 7 is kept in a fixed position relative to the frame 8. The rearward end 10 of the torsion spring rod 7 is rotatably supported by a bearing 11 carried by the frame 8. The universal joint fork 4 is attached to a lower rear suspension arm 12.

A second universal joint 13 comprises a vertically extending hinge fork 14 with its turning axis 15 shown as coinciding with the $z$—$z$ axis of joint 13. The fork 14 is carried by the axle housing 16. A horizontally extending hinge fork 17 for joint 13 is shown with its turning axis 18 coinciding with the $x$—$x$ axis of joint 13. A center cross member 19 supports and interconnects the forks 14 and 17. Fork 17 is attached to the rearward end of lower rear suspension arm 12.

A tie rod 20 is connected at its rearward end by a ball and socket joint 21 to a bracket 22 carried by the fork 4 and located substantially in the $x$—$x$ axis of universal joint 1, and is connected at its forward end by a ball and socket joint 23 to a bracket 24 carried by the frame 8.

During operation of the vehicle, whenever the rear axle housing moves upwardly relative to the frame 8, carrying with it universal joint 13, as indicated by fork 17 shown in dash outline, the forward bearing of fork 4 moves downwardly turning about the $x$—$x$ axis of universal joint 1, as indicated by arrow 25 and pulling the upward bearing of fork 2 laterally and towards the longitudinal vertical center plane of the vehicle, as indicated by arrow 26. A corresponding upward turn of the rearward bearing of fork 4 and a lateral shifting from the longitudinal vertical center plane of the vehicle simultaneously take place, the rigid center member 6 securing this turn.

The described upward movement of the axle housing 16 parallel to the road will result in a torsional deflecting turn of the torsion spring rod 7 in the direction of arrow 27.

The torsion spring rod 7 will have to be placed into the illustrated position with the necessary pretorsional deflection to secure a substantially vertical position of the universal joint fork 2 for the standard vehicle curb load.

Stops, not shown, should be provided to permit the described turns only and avoid larger turns about the universal joint axes. Since the turns described constitute approximately 8° only in each direction, the effects explained will not vary to any undesirable degree between intermediary and extreme positions. For the description of the operation of this invention, the normal load position of the vehicle with regard to the universal joint 1 is assumed to be that illustrated, and the further deflection of torsion spring rod 7 is assumed to be the result of lifting the axle housing 16 parallel to the road.

If the axle housing 16 moves, after being lifted, into an inclined position as indicated by the dash outline 28 and the arrow 29, the universal joints 13 and 1 will both participate in the turn and an additional deflection of the torsion spring rod 7 in the same direction as that caused by lifting the axle housing 16 will take place, as indicated by arrow 30, substantially compensating for the loss in spring deflection and resistance occurring in standard vehicles.

The longitudinally extending tie rod 20 produces a constant positioning of the axle housing 16, substantially centering it relative to the superstructure. Without the tie rod 20 the axle housing 16 would not only be free to float laterally in either direction, due to the vertical hinge axes 3 and 15, but the universal joints carried by the axle housing 16, would have a tendency to move directly about the corresponding axis 5 without even operating the torsion spring rod 7, the side with the greater loading pulling the axle housing 16 towards that side of the vehicle. The vertically extending axes 3 and 15 which provide the freedom for lateral shifting of the axle housing 16, serve to keep the lower rear suspension arm 12 substantially free of bending, permit a proper travel path for the universal joint 13 along an arc whenever the axle housing 16 moves into a position inclined towards the road, and most of all permit operation of the torsion spring rod 7 as desired. The lateral shifting of the axle housing 16 is resisted by the rod 20 or similar structure as described hereinafter.

The torsion spring rod 7 is shown as extending substantially longitudinally of the vehicle. This location is acceptable as one of many suitable locations. The most constant increase in stress during torsional windup of spring rod 7 would be secured if the spring could be placed substantially into the axis line 31, that is into an axis extending perpendicular to the plane containing the axes $z$—$z$ and 5. Such a position is practical. Extending the torsion spring rod 7 from the universal joint 1 diagonally towards the center of the frame near the differential housing would meet this condition.

The more spring rod 7 is shifted from axis 31 towards axis $y$—$y$ the more the spring rate changes. In the construction illustrated in Figure 1, the increase in resistance produced in torsion spring rod 7 during the first inch of upward travel of axle housing 16 will be slightly greater than that produced during the fourth inch of upward travel. However, within the average range of travel typical for the device, the differences are slight and the advantages of the selected locations substantial.

From the most favorable position for the torsion spring rod 7 along axis 31 any intermediate position within the fields 32 and 33 marked by dotted surfaces in the drawings and diminishing in width towards the less favorable positions, is acceptable.

This leads to the arrangement illustrated in Fig. 2, where the lower suspension arm itself serves as torsion spring rod 34. Identical reference characters to those used in Figure 1 are used in this figure wherever such parts serve similar purposes to facilitate comparison with Figure 1. The need for rotation of fork 2 of universal joint 1 relative to the frame 8 is eliminated, and fork 2 therefore is directly attached to the frame 8.

Whenever in the operation of the apparatus shown in Fig. 2 the horizontally extending fork 17 of universal joint 13 moves upwardly, as illustrated in dash outline 28, fork 4 of universal joint 1 tends to lower its forward bearing and to lift its rearward bearing while trying to turn about the $x$—$x$ axis of universal joint 1. Center cross member 6 resists the lowering and lifting of the forward and rearward bearings respectively of fork 4. Only torsional resistance is offered the turn of fork 4 about its own axis 5 and the turn can take place by deflecting the torsion spring rod 34. The forward end of rod 34 will deflect in the direction of arrow 35 relative to the rearward end which is rigidly connected to fork 17 of universal joint 13.

Whenever the axle housing 16 moves into an inclined position, as indicated by arrow 30, the forward end of torsion spring rod 34 will deflect further relative to its rearward end as indicated by arrow 36.

In Fig. 2, as well as in Figure 1, the upwardly directed travel of the universal joint 13 will be resisted by ⅞ × ⅞ or ¾ × ¾ of the corresponding amount of resistance produced during upward travel of both wheels supporting the axle housing 16, assuming a location of universal joint 13 at ¾ or ½ the distance between the center of the axle and the wheel and as compared to only one wheel moving upwardly or one wheel moving upwardly while the other moves downwardly. However, an immediate increase of resistance is secured by the additional windup of torsion spring rods 7 or 34 due to the moving of the axle into an inclined position, compensating nearly fully for the loss in resistance described.

Fig. 3 illustrates an automobile of the nonbanking kind and with front and rear rigid axles, comprising a superstructure 37 including a frame 8. Suspension arm units, each including a pair of universal joints, are disposed similarly to the arrangement illustrated in Fig. 2. Identical reference characters are shown in Fig. 3 to those shown in Fig. 2 for similar parts functioning in a like manner.

The superstructure 37 of the vehicle illustrated in Fig. 3 is supported in the front by a pair of front wheels 38 which carry wheel spindles 39 arranged to turn about king pins 40 which are carried by a front rigid axle 41. The rear of the superstructure 37 is supported by a pair of rear wheels 42 carried by the rear axle housing 16.

Pairs of laterally spaced universal joints 13 are carried by the front rigid axle 41 and the rear rigid axle housing 16 respectively. Each universal joint 13 comprises a fork 14 or tubular support 14 with a corresponding substantially vertically extending turning axis 15, and a fork 17 with a corresponding substantially horizontally and transversely extending turning axis 18. A center cross- or T-member 19 is placed as bearing support between the forks 14 and 17.

Additional pairs of laterally spaced universal joints 1 are carried by the vehicle frame 8 and located either to the front or to the rear of the corresponding rigid axles. For long wheel base cars, the universal joints 1 are located preferably intermediate the front and rear rigid axles as shown in the drawing. Each universal joint 1 comprises a fork 2 rigidly attached to the frame 8 and having a substantially vertically extending turning axis 3, and a fork 4 with a corresponding turning axis 5 extending substantially horizontally but inclined at approximately 45° in plan view relative to the longitudinally and vertically extending center plane for the vehicle. The 45° inclination is such that the points of intersection of the axes 5 for the front and rear universal joints 1 are located in said center plane and a shorter distance apart than the longitudinal distance between the pairs of universal joints 1. A center cross-member 6 is placed as a bearing support between the forks 2 and 4.

Where each pair of universal joints 1 is placed in front of its corresponding rigid axle (a suitable arrangement for a vehicle with sufficient front overhang) the distance between said points of intersection of the axes 5 will be substantially equal to the longitudinal distance between the universal joints 1. It will be greater than the distance between universal joints 1 where these pairs of joints are placed ahead of the front axle and behind the rear axle respectively.

For each of the four suspension arm units illustrated in Fig. 3, the longitudinally extending connecting rod 34 between the fork 17 of each corresponding axle supported universal joint 13 and the fork 4 of each frame supported universal joint 1 serves as a main vehicle support torsion spring, which might be enclosed by a tube (not shown) for protection and reinforcement.

The vehicle chassis illustrated in Fig. 3 further comprises two pairs of longitudinally extending upper torque rods 43, each attached at one end by a ball and socket joint or pivotal connection of similar freedom of movement 44 to its corresponding rigid axle and by a similar connection 45 at its other end to the frame 8.

A horizontal front track bar 46 extending substantially transversely of the vehicle is attached by the pivot 47 at one end to the frame 8 and is attached by the pivot 48 at the other end to the front rigid axle 41. Similarly, a horizontal rear track bar 49 extending substantially transversely of the vehicle is attached by the pivot 50 at one end to the frame 8 and is attached by the pivot 51 at the other end to the rear rigid axle housing 16. The track bars 46 and 49 function in a manner similar to that of the longitudinally extending tie rod 20 described above and accomplish for the laterally spaced pairs of the corresponding universal joints 1 what a single tie rod 20 interconnecting each individual universal joint 1 to the frame 8 would accomplish for securing a proper windup for each corresponding torsion spring.

Fig. 3 illustrates in dash-dot outline near the left front wheel a longitudinally extending steering drag link 52, and, extending intermediate the front wheels, a steering tie rod 53, each supported by corresponding lever arms, as is typical for the steering linkage of rigid axle supported automobiles.

The vehicle suspension illustrated in Fig. 3 functions as a whole by the working of each of the four suspension units as described for the left rear suspension illustrated in Fig. 2. The wheel rates will be substantially equal for the positions I, II and III and all corresponding intermediate positions as explained above. During curve ride, the vehicle will have substantially less outward lean than a vehicle of standard construction not equipped with additional anti-sway devices.

A characteristic of the vehicle illustrated in Fig. 3 is the use of eight vertically extending hinges with their corresponding axes 3 and 15, which together with the usually horizontal suspension hinges, form the universal joints 1 and 13. These vertically extending hinges are needed for reasons stated above although only small turns about their corresponding hinge axes take place during oscillation movement of the wheels. By far the greater movement takes place about the corresponding hinges which tend substantially parallel to the road.

Due to the need for such vertically extending hinges, the vehicle illustrated in Fig. 3 lends itself very well to conversion into a banking car, as illustrated in Fig. 4 and described hereinafter. A superstructure banking motion center located near the center of mass of the superstructure can be produced by simply changing the inclinations of the vertically extending hinges of the eight universal joints.

As described in applicant's Patent No. 2,576,686, referred to above, banking arms can be created by interposing inclined hinges between the superstructure and the wheels, the exact location and inclination of these hinges being subject to established rules cited in that patent. Where the banking hinge axes are disposed between the suspension arms and a rigid axle, they will be located within planes comprising said axis lines and the center points of the corresponding universal joints which are carried, in effect, by the frame 8 and located at the other ends of said suspension arms. The planes of a corresponding pair of laterally spaced inclined hinges are inclined toward each other and intersect in a line which forms the axis for the banking turn of that part of the superstructure supported by said pair of suspension arms.

Fig. 5 illustrates in rear elevation a universal joint, as employed in the structure illustrated in Fig. 3, for the rearward end support of the left rear suspension arm after the proposed change. By simply rearranging the location of the turning axis 15 from one substantially vertical into one inclined relative to the $x$—$x$, $y$—$y$, and $z$—$z$ axes as shown and marked by reference character 54, the desired banking turn axis for the corresponding portion of the superstructure supported by the corresponding pair of banking arms can be secured. The fork member belonging to the newly established axis 54 is marked with reference character 55. A center cross member 56 interconnects fork 55 and fork 17. The horizontally extending turning axis 18 will move into the heavy dotted outline position 57 while supporting the superstructure on an outside curve, and into the light dotted outline position 58 while supporting the superstructure on an inside curve.

The end of the banking arm located away from the banking hinge axis 54 is, in effect, a universally movable joint and is established by the point of intersection of the axes 3 and 5. The required freedom of movement for turn about the third axis, here corresponding to the $y$—$y$ axis as described above, is secured by the freedom for rotational turn of one end of the main vehicle support torsion spring relative to the other end.

Fig. 6 illustrates in front elevation, the universal joint which serves as the outer end of the banking arm, also referred to as a roll banking arm in applicant's application Serial No. 382,412, filed September 25, 1953, where the banking turn for the superstructure takes place about a zone substantially at the same height as the center of mass of the superstructure.

It is desirable in banking cars to substantially maintain the deflection of the superstructure supporting resilient means during the banking turn both on the inside and on the outside of the curve. A decrease in deflection of the resilient means supporting the superstructure on an outside curve, as compared to the deflection taking place in vehicles not equipped with means for banking, will result in a loss of banking effect. An increase in deflection will in effect lower the turn center during banking of the superstructure and provide thereby a theoretical lever arm extending between the mass center of the superstructure and the banking motion center now located below it and on which the centrifugal force may become effective in trying to turn the superstructure outwardly instead of inwardly. It is for this reason that the position of the turning axis 3 of the universal joint 1 also has to be changed to one substantially parallel to the newly established axis 54, thereby intersecting the corresponding axis for the hinge located at the other side of the vehicle substantially in the vertically and longitudinally extending center plane of the vehicle. Reference character 59 is given to the new location of the originally vertically extending axis 3. The fork member belonging to the newly established axis 59 is marked with reference character 60.

Since the oscillation axis 5 is inclined in plan view relative to the $x$—$x$ and $y$—$y$ axes, the outer ends of the fork 4 do not change their horizontal positions noticeably during the banking turn of fork 4 about the axis 59 as indicated by arcs 61 and 62. Only by participating in the banking turn of the superstructure and as part of the full universal joint attached thereto does the axis 5 change its position into one substantially parallel to axis 57 for the curve outside position or to axis 58 for the curve inside position, thereby indicating that no change in torsional deflection has taken place due to the banking turn of the superstructure.

The inclined position of the axis 59 permits a banking turn of the suspension arm and torsion spring 34 about the axis 59 during the banking turn of the superstructure without substantially lifting the forwardly located fork supported bearing and without lowering substantially the rearwardly located fork supported bearing of the fork 4, and without substantially influencing the deflection of the corresponding torsion spring 34.

The change in position of axis 3 to 59 and of axis 15 to 54 will have little influence on the amount of deflection and the resulting wheel rate for the corresponding wheels during general wheel oscillation, and will in fact secure a more constant wheel rate since the travel paths of the corresponding bearings of the universal joints are less inclined towards each other. For this reason similar inclinations might be chosen even for nonbanking cars although such an arrangement would be more expensive.

Fig. 4 illustrates a banking vehicle supported in the rear by apparatus constructed in accordance with this invention. In the front, the vehicle superstructure is supported by banking structure including independently suspended wheels to conform with an overall vehicle suspension arrangement as employed in most passenger automobiles built at present, but including all basic elements needed to secure banking. A comparison thereby is facilitated between universal joints positioned for independently suspended wheels and universal joints supported by a rigid axle structure and positioned according to this invention, both with regard to axis location and relative suspension arm and spring location. The structure illustrated in the rear may readily be used in the front of a vehicle where a banking car with rigid axles at both ends is desired.

In describing the rear end of the vehicle illustrated in Fig. 4, identical reference characters have again been used for identical parts functioning as described previously.

The vehicle, in general, comprises a superstructure including a frame 8, front wheels 63 connected to said frame by a linkage comprising roll banking arms described hereinafter. In the rear a pair of wheels 42 support a rigid axle housing 16. A pair of laterally spaced lower suspension arms 12 extend between the axle housing 16 and the frame 8. Each arm 12 is connected at its rearward end by a universal joint comprising a fork 17 having a substantially laterally and horizontally extending hinge axis 18 and a fork 55 having a substantially longitudinally and transversely inclined banking hinge axis 54. Forks 17 and 55 are arranged to form one end of a roll banking arm. A center cross member 56 interconnects the forks 17 and 55. The forward end of each lower rear suspension arm 12 is connected to the superstructure by a universal joint comprising a fork 4 having a substantially horizontally extending hinge axis 5 which is inclined in plan view relative to the x—x and y—y axes of the vehicle, and a fork 60 having an inclined axis 59 extending substantially parallel to the axis 54, as well as a center cross member 64 interconnecting the forks 60 and 4. Each fork 60 is attached to the rearward end of a longitudinally extending superstructure supporting torsion spring 65, which is supported near its rearward end by a bearing 66 carried by a bracket 67 attached to frame 8 and is rigidly attached at its forward end to frame 8 by a frame bracket 68.

The torsion springs can be arranged in any suitable position as either transversely or longitudinally of the vehicle as explained above for the torsion springs in the description of Figs. 1 and 2. At least one, but preferably a pair of upper torque rods 69 also extend between the rear axle housing 16 and the frame 8 in a plane spaced vertically from the plane containing the suspension arms 12, each rod 69 being connected at its rearward end to the axle housing 16 by a universally movable joint such as the rubber bearing or ball and socket joint 70, and connected at its forward end by a similar joint 71 to the frame 8.

In the front of the vehicle the superstructure is supported by a pair of roll banking arms 72 and 73 similar to those disclosed in my copending application Serial No. 448,481, filed August 9, 1954, now Patent No. 2,739,658, dated March 27, 1956. Each front wheel 63 forms a part of the corresponding roll banking arm, and is supported by a spindle member 74 which provides support for an upper ball and socket joint 75 and for a lower ball and socket joint 76. The centers of the ball and socket joints 75 and 76 establish the king pin axis 77 about which the front wheels are steered.

The upper ball and socket joint 75 is carried by the outer end of an upper wheel suspension arm 78 which is pivotally attached to the frame 8 by a substantially longitudinally extending hinge member 79. The lower ball and socket joint 76 is carried by the transversely extending leg 80 of a lower wheel suspension arm 81, which also includes a longitudinally extending leg 82. Leg 80 is supported at its inner end by a ball and socket joint 83 carried by a longitudinally extending bell crank lever arm 84 which also carries the ball and socket joint supported by the inner end of the transversely extending leg of the corresponding lower suspension arm located at the other side of the vehicle.

The lever arm 84 is arranged to pivot about a substantially vertically extending hinge 85 carried by the frame 8.

The longitudinally extending leg 82 does not in itself constitute a resilient means, but is a rigid arm supported at its forward end by a king pin banking hinge 86 carried by the transversely extending leg 80 and inclined towards the longitudinally and transversely extending vertical center planes of the vehicle, with the upper part of the axis line for hinge 84 being nearer the vertically extending intersecting line of said planes than the lower part.

The rearward end of leg 82 is connected by a universal joint 87 which comprises a fork 89 having a substantially horizontally and transversely extending axis 88 and a fork 91 having a substantially vertically extending axis 90, with an interconnecting center cross member 92, to a longitudinally extending superstructure supporting main torsion spring 93.

Torsion spring 93 is attached at its forward end to fork 91 and is supported near its forward end by a bearing 94, which permits rotational turn of that end of the spring and is carried by the bracket 68 attached to the frame 8. The rearward end of the front torsion spring 93 is rigidly attached to the bracket 67 supported by the frame 8. The torsion spring 93 thereby is fully supported by the frame and kept free of stresses other than those caused by resilient support. The longitudinally extending leg 82 which operates spring 93 can be kept relatively short and strong, which is a great improvement over prior structures.

A sway bar 95 extends transversely of the vehicle and is pivotally attached by bearings 96 to the frame 8 and comprises longitudinally extending outer arms 97. The outer end of each arm 97 is pivotally connected by a flexible connection 98 to the upper end of an inclined shackle 99 which in turn is pivotally connected at its lower end by a flexible connection 100 to the corresponding transversely extending leg 80 of the lower suspension arm 81.

The bell crank lever arm 84, pivotally attached by hinge 85 to the frame 8, is part of a bell crank 101 which comprises a substantially transversely extending lever arm 102 which carries at its outer end a pivotal or ball and socket joint connection 103.

In the rear of the vehicle, at least one of the lower suspension arms 12 carries at its forward end a lever arm 104 which extends horizontally and transversely in a direction opposite to that of lever arm 102 and carries at its outer end a ball and socket joint 105 located to substantially coincide with the x—x axis of the forwardly located universal joint for the support of suspension arm 12. A longitudinally extending tie rod 106 interconnects ball joints 103 and 105 and serves to maintain track holding between the pairs of front wheels and rear wheels at all times.

The pivotal hinge 85 for bell crank 101 is supported by a worm gear housing 107 which contains a non-reversible worm gear 108 with a cam lever 109 which is attached to the hinge 85. This mechanism constitutes a part of a force diverter unit arranged to block undesirable lateral shifting between the superstructure and running gear of the vehicle, and described in my copending application Serial No. 400,313, filed December 24, 1953. This control mechanism also comprises a speedup gear unit 110, operably connected to a vertically extending lever 111 which is exposed to pressures exerted at its outer end and changing continuously in direction. These pressures are exerted by a piston-operated resilient means 112 suitably placed in a housing 113 and operated by a crank lever 114 rotated during operation of the vehicle engine, for instance by the turn of the engine cam shaft 115. This method of operating the force diverter is disclosed in my copending application Serial No. 486,103, filed February 4, 1955.

In general, the banking of the superstructure of the vehicle illustrated in Fig. 4 is caused by the deflection of the superstructure supporting springs 65 and 93 which tend to deflect the sway bar 95 which immediately finds relief from torsional deflection by lifting the superstructure on an outside curve and lowering it on an inside curve, turning it into a banked position, whereby the transversely extending legs 80 of the lower suspension arms 81 as well as the rear axle housing 16 shift laterally relative to the frame. But only when a constant side force exerts itself on the vehicle will the force diverter operate and permit the banking motion to take place.

Fig. 7 illustrates the banked position of the superstructure relative to the rear axle and in particular the positions of the axes of the universal joints placed at the ends of the lower suspension arms 12 according to this invention. Since the wheel deflection may vary during the ride of the vehicle while banking, two guide arcs 116 and 117, one on each side of the vehicle, are shown in Fig. 7 and indicate selected travel lines for the centers of the universal joints which are placed between the suspension arms 12 and the frame 8, as determined by the selected inclinations of the axes 54.

As has been disclosed in detail in applicant's Patent No. 2,576,686 referred to above, a banking arm may carry its leading banking hinge either by the vehicle superstructure or by the rigid axle, with the other end of the banking arm constituting an effective universally movable joint. The drawings illustrating selected embodiments of the present invention show the leading banking hinge carried by the axle in order to have the torsion spring supported in effect by the frame. Where a support for the corresponding torsion spring, by the axle is considered desirable, the leading banking hinge of the banking arm is carried by the frame, and the corresponding universal joints with their typical positions for the corresponding axes will have to be reversed.

A mirror-like reversal for the positions of the corresponding hinges from those illustrated also takes place where the front wheel or axle carriers of the running gear are disposed in front of the pair of front wheels and the rear axle carriers are disposed behind the rear axle. The resulting arrangement may be visualized where an imaginary cut along a vertical transverse plane splits the vehicle illustrated in Fig. 4 into two halves and the front half is moved to the rear, the rear half to the front, with the two newly placed halves joined together. Such arrangement would call for a greatly lengthened front-to-rear tie but might be practical for buses or trucks.

The structures illustrated and described above facilitate the manufacture on a mass production basis of automobiles which can be sold as either non-banking or banking vehicles. A change in direction of a number of hinges and the addition of a guide rod coordinating the front and rear running gears of the vehicle and a control and release mechanism are the essential changes. The risk of introducing banking cars will be greatly reduced and public reaction to a change from non-banking to banking cars can be safely observed while offering for each kind of vehicle an improved running gear.

Various modes of carrying out the invention are contemplated as within the scope of the following claims particularly pointing out and distinctly claiming the subject matter which is regarded as the invention.

I claim:

1. A vehicle comprising a superstructure adapted to roll bank on turns, resilient means stressed in torsion for the support of the superstructure, pairs of opposed roll banking arms disposed to carry the superstructure, the arms of each pair being spaced laterally apart on opposite sides of the longitudinal vertical center plane of the vehicle, each roll banking arm extending between the superstructure and a rigid axle structure therefor with the ends of the arms for each pair of roll banking arms embodying in effect a universally movable joint at one corresponding end of each arm and a skew pivotally effective banking axis at the other end of the arm, said universally movable joints each comprising a universal joint with one axis thereof extending substantially horizontally and the other axis extending substantially inclined to the road and with both said axes extending inclined towards said center plane and intersecting said center plane at points located above the road and spaced farther away from the corresponding rigid axle than the center point of the corresponding universal joint, said universal joint being arranged to turn about its longitudinally and horizontally extending center axis in opposition to said resilient means carried by the superstructure, said skew pivotally effective banking axes each constituting one axis of a universal joint, the other axis of said last-named universal joint extending substantially horizontally and transversely of the vehicle, whereby said resilient means for the pair of roll banking arms are increasingly torsionally stressed during upward movement of the pair of wheels supporting the corresponding end of the superstructure and are further increasingly stressed on that side of the vehicle on which the corresponding wheel maintains its position relative to the superstructure while the other wheel of the pair moves downwardly relative to the superstructure.

2. A vehicle comprising a superstructure adapted to roll bank on turns, resilient means stressed in torsion for the support of the superstructure, pairs of opposed roll banking arms disposed to carry the superstructure, the arms of each pair being spaced laterally apart on opposite sides of the longitudinal vertical center plane of the vehicle, each roll banking arm extending between the superstructure and a rigid axle structure therefor with the ends of the arms for each pair of roll banking arms embodying in effect a universally movable joint at one corresponding end of each arm and a skew pivotally effective banking axis at the other end of the arm, said universally movable joints each comprising a universal joint carried by the superstructure, with one axis thereof extending substantially horizontally and the other axis extending inclined to the road and with both said axes extending inclined toward said center plane and intersecting said center plane at points located above the road and spaced farther away from the corresponding rigid axle than the center point of the corresponding universal joint, said skew pivotally effective banking axes each constituting one axis of a universal joint carried by the axle, the other axis of said axle supported universal joint extending substantially horizontally and transversely of the vehicle, said resilient means constituting torsion springs each interconnecting the universal joint carried by the superstructure with the corresponding universal joint carried by the axle, whereby said torsion springs are increasingly stressed during upward movement of the pair of wheels supporting the corresponding rigid axle and are further increasingly stressed on that side of the vehicle on which the corresponding wheel maintains its position relative to the superstructure while the other wheel of the pair moves downwardly relative to the superstructure.

3. The combination of claim 1 wherein said resilient means is a torsion spring rotatably supported by the superstructure near the end which carries said universal joint and rigidly attached to the superstructure at the other end.

4. In a motor vehicle a superstructure, a running gear including wheel supported front and rear rigid axles, front and rear linkage means mounting said superstructure to said running gear, said linkage means including elements disposed one to either side of the longitudinal vertical center plane of the vehicle, each element comprising a pair of vertically spaced longitudinally extending arms, a two axis universal joint connecting one end of one of said arms to the frame with one of the axes extending substantially horizontally and inclined to said center plane and intersecting that center plane at a point located a greater distance away from the corresponding rigid axle than the center of said universal joint and with the other of the axes extending vertically, a second two axes universal joint connecting the other end of said arm to the rigid axle with one of the axes extending substantially horizontally and transversely and with the other extending substantially vertically, said arm of the pair of arms being supported by said universal joints and constituting the resilient support for the corresponding share of the superstructure, and said other arm of the pair being connected by universally movable joints at one end to the frame and at the other end to the axle, whereby said resilient means are torsionally stressed for the support of the superstructure, increasingly torsionally stressed during upward movement of the pair of wheels supporting the corresponding rigid axle, and further increasingly stressed on that side of the vehicle on which the corresponding wheel maintains its position relative to the superstructure while the other wheel of the pair moves away from the superstructure, and front and rear means extending between the superstructure and each rigid axle to substantially maintain the front and rear pairs of wheels in longitudinal alignment.

5. In a motor vehicle a superstructure, a running gear including wheel supported front and rear rigid axles, resilient means carried by said superstructure and having one end secured rigidly thereto, front and rear linkage means mounting said superstructure to said running gear, said linkage means including elements disposed on either side of the longitudinal vertical center plane of the vehicle, each element comprising a pair of vertically spaced longitudinally extending arms, a two axes universal joint connecting one end of one of said arms to the rigid axle with one of the axes extending substantially horizontally and transversely and the other extending substantially vertically, a second two axes universal joint connecting the other end of said arm to the corresponding free end of said resilient means with one of the axes extending substantially horizontally and inclined to said center plane and intersecting said center plane at a point located a greater distance away from the corresponding rigid axle than the center of said universal joint and with the other of the axes extending vertically, whereby said resilient means are torsionally stressed for the support of the superstructure, increasingly torsionally stressed during upward movement of the pair of wheels supporting the corresponding rigid axle, and further increasingly torsionally stressed on that side of the vehicle on which the corresponding wheel maintains its position relative to the superstructure while the other wheel of the pair moves away from the superstructure, said vertically extending axis turning into a position inclined to said plane in opposition to the superstructure supported resilient means during upward movement of the corresponding wheel relative to the superstructure, universally movable joints connecting said other arm of the pair at one end to the frame and at the other end to the axle, and front and rear linkage means extending transversely between the superstructure and each rigid axle to substantially maintain the front and rear pairs of wheels in longitudinal alignment.

6. The combination of claim 5 wherein said resilient means are torsion springs each rotatably supported by the superstructure near the end which carries said universal joint and rigidly attached to the superstructure at the other end.

7. A vehicle comprising a superstructure adapted to roll bank on turns, front independently suspended wheels and a wheel supported rigid rear axle, resilient means for the support of the superstructure and fixed at one end thereto, two pairs of opposed roll banking arms disposed to carry the superstructure, the arms of each pair being spaced laterally apart on opposite sides of the longitudinal vertical center plane of the vehicle, each roll banking arm of one pair being located in the rear of the vehicle including structure extending between said rigid axle and the superstructure and comprising a pair of vertically spaced longitudinally extending arms, a two axes universal joint connecting one of said arms at one end to said rigid axle with one of the axes extending substantially horizontally and transversely and the other axis extending substantially inclined to the road and to said plane, a second two axes universal joint connecting the other end of said arm to the free end of said superstructure supporting resilient means with one of the axes extending substantially horizontally and inclined to said center plane and with the other axis extending inclined to the road and to said center plane, said inclined axes intersecting said center plane at points located a greater distance away from said rigid axle than the center of said last-named universal joint, said last-named universal joint arranged to turn about its longitudinally horizontal axis in opposition to the corresponding resilient means during upward movement of the corresponding wheel relative to the superstructure, whereby said resilient means for the pair of roll banking arms are increasingly torsionally stressed during upward movement of the pair of wheels supporting the corresponding rigid axle and further increasingly stressed on that side of the vehicle on which the corresponding wheel maintains its position relative to the superstructure while the other wheel of the pair moves downwardly relative to the superstructure, each roll banking arm of the other pair located in the front of the vehicle extending from the superstructure to the effective road support therefor with the ends of the arms for the pair of roll banking arms embodying in effect a universally movable joint at the corresponding end of each arm and a skew pivotally effective banking axis at the other end of the arm, means including a longitudinally extending lever located intermediate the wheels and interconnecting the roll banking arms of the pair to retain said effective universally movable joints for the pair in substantially constant spaced relation, each said last-named roll banking arm including a wheel suspension arm comprising a transversely and a longitudinally extending leg, a king pin banking hinge pivotally interconnecting the outer ends of said legs and disposed to provide a skew pivotally effective banking axis, the longitudinally extending leg of each pair carrying at its inner end a universal joint comprising a vertically and a transversely extending axis, said last-named universal joint being arranged to turn about its longitudinally and horizontally extending axis in opposition to said resilient means carried by the superstructure, additional resilient means and related guiding means disposed to roll the superstructure into a banked position during curve ride, a tie interconnecting the front and rear superstructure support structure, a self-locking reduction gearing carried by the superstructure and connected to said tie to block relative lateral shifting between the superstructure and wheels tending to result from wheel road shock forces, and resilient control means operable in response to vehicle engine operation to actuate said reduction gear in a direction adjusting said blocking to provide for movement of said tie and banking of the superstructure.

8. The combination of claim 7 wherein said resilient means constitute at least in part torsion springs interconnecting the first and second universal joints.

9. The combination of claim 7 wherein said front and rear resilient means are torsion springs each rotatably supported by the superstructure near the corresponding end which carries the universal joint and rigidly attached to the superstructure at the other end.

10. A vehicle comprising a superstructure adapted to roll bank on turns, a set of front and a set of rear wheel carriers disposed to suport said superstructure and spaced longitudinally of the same, each front wheel carrier comprising a wheel spindle member, an upper wheel suspension arm pivotally connected at its inner end to the superstructure, a ball and socket joint connecting said arm to said wheel spindle member, a lower wheel suspension arm composed of a transversely and a longitudinally extending leg, a universal joint connecting each longitudinally extending leg at its inner end to the superstructure, an inclined king pin banking hinge connecting each longtiudinally extending leg at its outer end to the corresponding transverse leg intermediate the ends of the latter, a pivotal support for the inner ends of said transverse legs pivotally carried by the superstructure, a ball and socket joint connecting the outer end of each transverse leg to the corresponding wheel spindle member, and lever means stabilizing the position of said pivotal support to control the banking of the superstructure on turns, said longitudinally extending legs constituting operating resilient means carried by the superstructure and resiliently supporting it upon said front wheel carriers, each rear wheel carrier including a longitudinally extending lower suspension arm connected at one end by a universal joint to the rear axle with one of the two hinges of the universal joint positioned to serve as a roll banking hinge, and connected at the other end by a universal joint to the end of a torsion spring supported at said end rotationally and at the opposite end rigidly by the superstructure, said last-named universal joint comprising one hinge inclined to the road and to the longitudinal vertical center plane of the vehicle and comprising another hinge extending substantially parallel to the road and arranged substantially parallel in plan view to the first-named hinge of said last-named universal joint, a front to rear tie connecting at least one wheel carrier disposed in the front of the vehicle to one wheel carrier disposed in the rear of the vehicle to induce the front and rear wheel carriers to move laterally substantially in unison during the roll banking of the superstructure, means connecting the superstructure and said front to rear tie including irreversible gear mechanism rigidly preventing relative lateral movement between the wheels and the superstructure, and means including resilient control means responsive to vehicle engine forces to release said preventive means to permit relative lateral movement between the superstructure and the running gear for banking of the superstructure.

11. The combination of claim 5 wherein said resilient means is a torsion spring rotatably supported by the superstructure near the end which carries said universal joint and rigidly attached to the superstructure at the other end, said torsion spring being placed substantially horizontally and transversely of the vehicle.

12. A combination of claim 5 wherein said resilient means is a torsion spring rotatably supported by the superstructure near the end which carries said universal joint and rigidly attached to the superstructure at the other end, said torsion spring extending in a direction substantially perpendicular to the plane containing the hinge axes of the universal joint located near its rotatably supported end.

13. The combination of claim 10, wherein a ball and socket joint is employed to connect the rear end of said front to rear tie to said wheel carrier disposed in the rear of the vehicle and is located in a transversely extending axis containing the point of intersection of the two axes of the universal joint connected to the end of the corresponding torsion spring.

14. A vehicle comprising a superstructure adapted to roll bank on turns, resilient means stressed in torsion for the support of the superstructure, pairs of opposed roll banking arms disposed to carry the superstructure, the arms of each pair being spaced laterally apart on opposite sides of the longitudinal vertical center plane of the vehicle, each roll banking arm extending between the superstructure and the effective road support therefor with the ends of the arms for each pair of roll banking arms embodying in effect a universally movable joint at one corresponding end of each arm and a skew pivotally effective banking axis at the other end of the arm, said universally movable joints each comprising a universal joint with one axis thereof extending substantially horizontally and the other axis extending substantially inclined to the road and with both said axes extending inclined towards said center plane and intersecting said center plane at points located above the road and spaced farther away from the corresponding rigid axle than the center point of the corresponding universal joint, said universal joint being arranged to turn about its longitudinally and horizontally extending center axis in opposition to said resilient means carried by the superstructure, said skew pivotally effective banking axes each constituting one axis of a universal joint, the other axis of said last-named universal joint extending substantially horizontally and transversely of the vehicle, whereby the wheel rates established by the wheel upward movement of the pair of wheels supporting said rigid axle are substantially the same for one-wheel-up movement with the other wheel stationary and for one-wheel-up movement with the other wheel down movement, all up movement constituting a vertical movement of the corresponding wheel towards the frame.

15. In a motor vehicle a superstructure, a running gear including wheel supported front and rear rigid axles, front and rear linkage means mounting said superstructure to said running gear, said linkage means including elements disposed on opposite sides of the longitudinal vertical center plane of the vehicle, each element comprising a pair of vertically spaced longitudinally extending arms, a two axes universal joint connecting one end of one of said arms to the frame with one of the axes extending substantially horizontally and inclined to said center plane and intersecting said center plane at a point located a greater distance away from the corresponding rigid axle than the center of said universal joint and with the other of the axes extending vertically, a second two axes universal joint connecting the other end of said arm to the rigid axle with one of the axes extending substantially horizontally and transversely and with the other extending substantially vertically, said arm of the pair of arms supported by said universal joints constituting the resilient support for the corresponding share of the superstructure, and universally movable joints connecting the other arm of the pair at one end to the frame and at the other end to the axle, whereby the wheel rates established by the wheel upward movement of the pair of wheels supporting said rigid axle are substantially the same for one-wheel-up movement with the other wheel stationary and for one-wheel-up movement with the other wheel down movement, all up movement constituting a vertical movement of the corresponding wheel towards the frame.

16. A vehicle comprising a superstructure adapted to roll bank on turns, resilient means stressed in torsion for the support of the superstructure, front and rear rigid axles, pairs of opposed roll banking arms disposed to carry the superstructure, the arms of each pair being spaced laterally apart on opposite sides of the longitudinal vertical center plane of the vehicle, each roll banking arm extending between the superstructure and the corresponding rigid axle with the ends of the arms for each pair of roll banking arms embodying in effect a universally movable joint at one corresponding end of each arm and a skew pivotally effective banking axis at the other end of the arm, said universally movable joints each comprising a universal joint with one axis thereof extending substantially horizontally and the other axis extending substantially inclined to the road and with both said axes extending inclined towards said center plane at points located above the road and spaced farther away from the corresponding rigid axle than the center point of the corresponding universal joint, said universal joint being arranged to turn about its longitudinally and horizontally extending center axis in opposition to said resilient means carried by the superstructure, said skew pivotally effective banking axes being carried by said rigid axle and each constituting one axis of a universal joint, the other axis of said last-named universal joint extending substantially horizontally and transversely of the vehicle, whereby said resilient means for the pair of roll banking arms are increasingly torsionally stressed during upward movement of the pair of wheels supporting the corresponding end of the superstructure and are further increasingly stressed on that side of the vehicle on which the corresponding wheel maintains its position relative to the superstructure while the other wheel of the pair moves downwardly relative to the superstructure.

17. A vehicle comprising a superstructure adapted to roll bank on turns, at least one rigid axle, a plurality of sets of front and rear wheel carriers disposed to support said superstructure and spaced longitudinally of the same, each set of carriers together with the wheels associated therewith constituting at least a pair of opposed roll banking arms arranged to secure a roll banking motion center located in the height of the center of gravity of the superstructure, resilient means associated with each carrier and disposed to provide for relative vertical oscillation between the superstructure and the point of effective road support for the corresponding banking arm, said roll banking arms each including a lower suspension arm carrying a universal joint at each end, one of said universal joints comprising a roll banking hinge, the other of said universal joints including a hinge extending substantially horizontally and inclined to the longitudinal vertical center plane of the vehicle and arranged to operate said resilient means during oscillation of the corresponding wheel, said roll banking hinge having an axis located inclined towards the median plane and the vertical transverse planes for the vehicle containing the wheel centers and securing freedom for the superstructure to roll about an effective motion center located approximately in height of its center of mass, additional resilient means in the form of a bar carried by the superstructure at at least one end and connected to the outer ends of the wheel carriers by means of shackles arranged to secure roll banking about the banking motion center, a tie connecting at least one front roll banking arm to one rear roll banking arm whereby the wheel rates established by the wheel upward movement of the pair of wheels supporting said rigid axle are substantially the same for one-wheel-up movement with the other wheel stationary and for one-wheel-up movement with the other wheel down movement.

18. A vehicle comprising a superstructure adapted to roll bank on turns and supported by pairs of wheels, at least one pair of said wheels supporting a rigid axle, torsion springs for the support of the superstructure, longitudinally extending suspension arms for said wheels constituting a pair of opposed roll banking arms, said roll banking arms arranged in pairs and disposed to resiliently support the superstructure, the arms of each pair being spaced laterally apart on opposite sides of the longitudinal and vertical center plane of the vehicle, at least one pair of said banking arms extending between the superstructure and said rigid axle structure with the ends of the corresponding suspension arms for said last-named roll banking arms embodying in effect a universal joint at each corresponding end of each arm, the universal joints connecting said last-named suspension arms to the superstructure having the axes of the corresponding hinges that serve predominantly the oscillation movements of the corresponding wheels located in a common plane extending substantially parallel to the road and intersecting the transversely extending vertical plane comprising the corresponding wheel spindles carried by said rigid axle at an angle of approximately 45° with the point of intersection for each side located at the same side as the corresponding suspension arm and being a greater distance away from said center plane than said suspension arm.

19. The combination of claim 18 wherein said universal joints connecting the rear suspension arms to the frame have the axes of the corresponding hinges thereof serving predominantly the banking motion of the superstructure extending inclined to the road and substantially parallel to each other and located in a common plane inclined to said center plane with the line of intersection of said planes extending longitudinally substantially in the height of the center of mass of the superstructure.

20. The combination of claim 18 wherein each of said universal joints connecting a corresponding rear suspension arm to the superstructure has the hinges that are provided predominantly for the oscillation movements of the corresponding wheels serve as corresponding hinge forks of said universal joints, said forks being attached to the ends of the torsion springs rotatably supported by the superstructure and supporting the corresponding share of the vehicle, the other ends of the torsion springs being rigidly attached to the superstructure.

21. A vehicle comprising a superstructure supported by pairs of wheels, at least one pair of said wheels supporting a rigid axle, a pair of vertically spaced longitudinally extending suspension arms for each wheel supported axle end, one of said suspension arms of the pair connected at one end to the rigid axle by a universal joint comprising a substantially vertically and a substantially horizontally and transversely extending hinge, and connected at the other end to the superstructure by a universal joint comprising a substantially vertically and a substantially horizontally extending hinge arranged inclined to the vertically and longitudinally extending median plane of the vehicle, the axes of said horizontally extending last-named hinges intersecting the transversely extending vertical plane comprising the wheel spindles carried by said rigid axle at an angle of approximately 45° with the point of intersection for each side located at the same side as the corresponding suspension arm and being a greater distance away from said median plane than said suspension arm, and resilient means each operated by one of said last-named universal joints for the resilient support of the superstructure, whereby increasing torsional stress is secured during movement of the pair of wheels supported by said rigid axle towards the superstructure, and additionally increasing torsional stress is secured within the resilient means located on that side of the vehicle on which the corresponding wheel does not change its relative position to the superstructure, while the wheel on the other side of the vehicle moves away from the superstructure.

References Cited in the file of this patent

UNITED STATES PATENTS 2,580,558    Kolbe   ---------------- Jan. 1, 1952